UNITED STATES PATENT OFFICE.

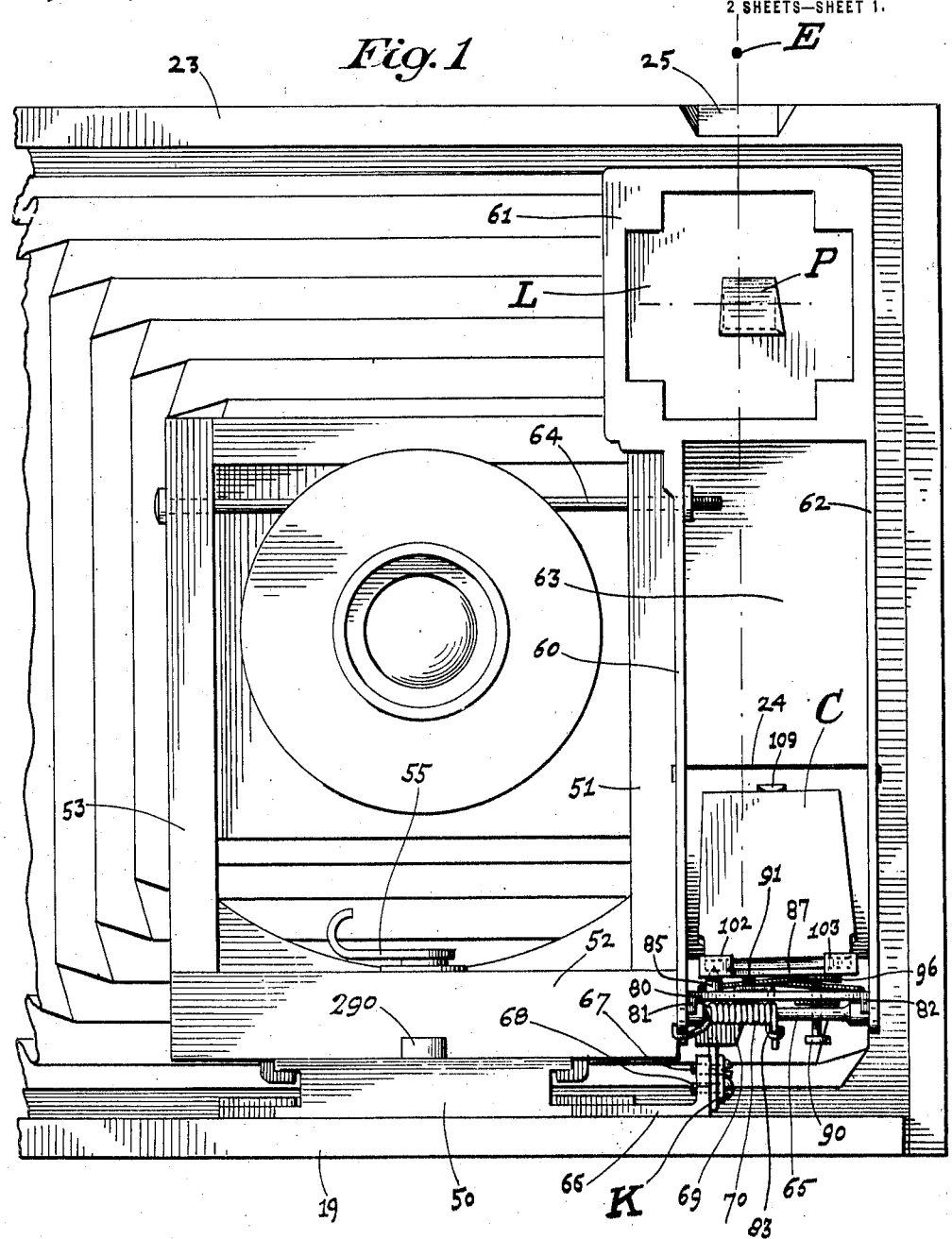

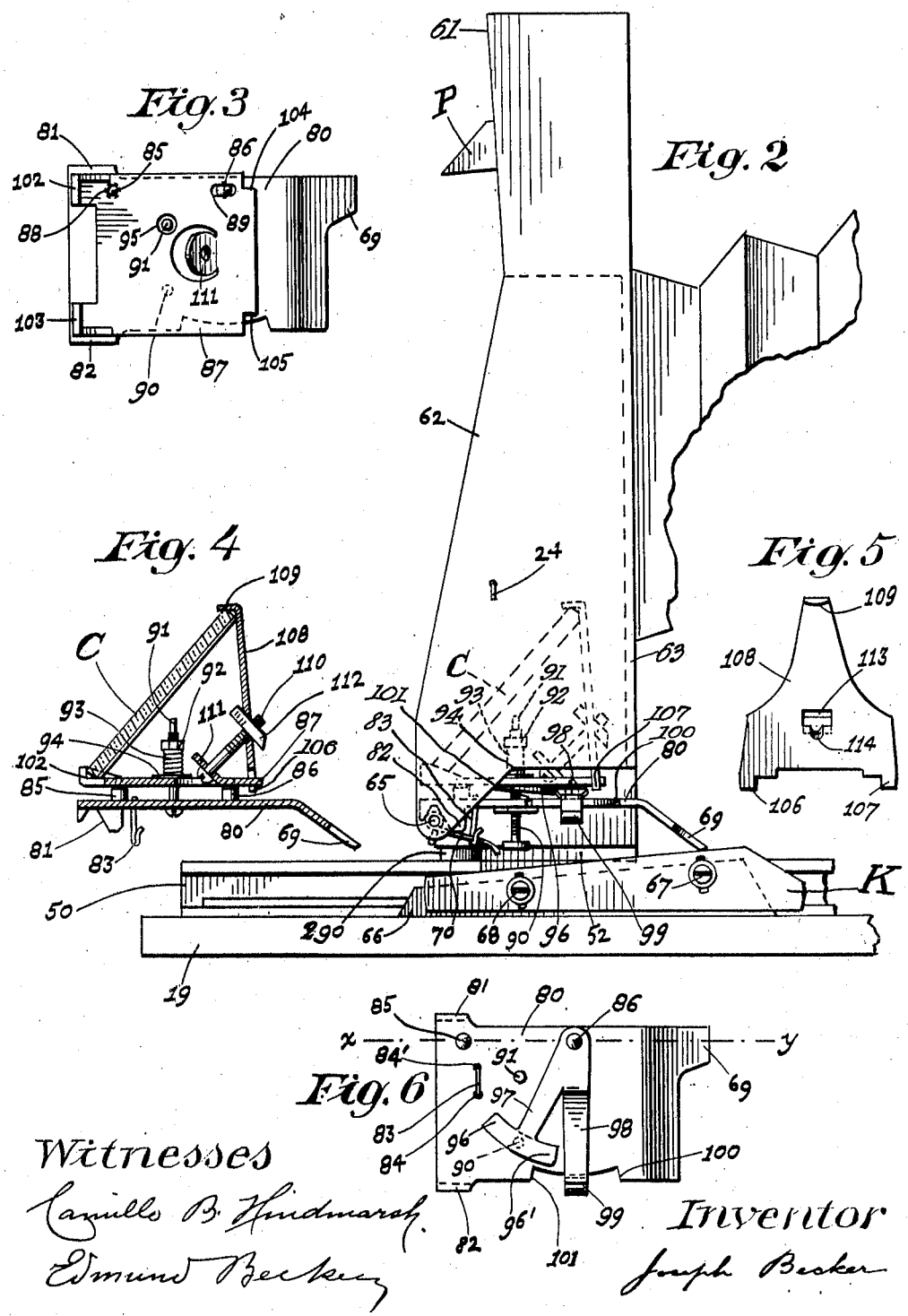

JOSEPH BECKER, OF WASHINGTON, DISTRICT OF COLUMBIA, ASSIGNOR TO EASTMAN KODAK COMPANY, OF ROCHESTER, NEW YORK, A CORPORATION OF NEW YORK.

OPTICAL FOCUSER.

1,319,750.  Specification of Letters Patent.  Patented Oct. 28, 1919.

Application filed August 16, 1916. Serial No. 115,309.

*To all whom it may concern:*

Be it known that I, JOSEPH BECKER, a citizen of the United States, residing at Washington, in the District of Columbia, have invented a new and useful Improvement in Optical Focusers, of which the following is a specification.

My present application is identified for convenience of reference as Case Am.

My present invention relates to optical focusers of the type showing at least one movable image, and it consists in means for varying, quickly and at will, the focus-indicating position of such movable image.

My present invention, therefore, relates to all focusers of the mirror type shown in my Case A, now Patent 1,178,474, issued April 4, 1916; and it, therefore, likewise relates to all focusers disclosed in my other applications or patents, as follows:

Case B, now Patent 1,178,475, issued April 4, 1916; Case C, now Patent 1,178,476, issued April 4, 1916; Case D, now Patent 1,190,623, issued July 11, 1916; Case F, now Patent 1,195,947, issued August 22, 1916; Case J, now Patent 1,210,136, issued December 26, 1916; Case W, now Patent 1,195,948, issued August 22, 1916; Case Ag, now Patent 1,240,651, issued September 18, 1917; Case Ah, now Patent 1,210,134, issued December 26, 1916; Case Ai, Serial No. 88,619, filed April 3, 1916; Case Ak, continued as Case Ax and now Patent 1,240,788, issued September 18, 1917; and Case AL, now Patent 1,210,135, issued Dec. 26, 1916.

In the present embodiment, my invention consists more specifically in means for varying the focus-indicating position of such movable image, quickly and at will, from the focus-indicating position of coincidence seen in Fig. 8 of my said Case A, or in Fig. 11 of my said Case B, to a focus-indicating position of mere alinement as in Fig. 14 of my said Case B, so that the operator may quickly and at will, use any preferred one or even both of these focus-indicating positions, on the same given object to be focused on.

This change in the focus-indicating position may be produced in many different ways involving the use of auxiliary optical devices such as an offsetting prism, but is preferably done, without any additional optical element, by slightly and suitably inclining one of the focuser mirrors on its support as already indicated in my said Case B, page 4, lines 52 to 81, where the mirror so inclined is a pivoted object mirror; or, as already indicated in my said Case C, page 4, lines 45 to 72, where the mirror so inclined is a fixed eye mirror.

The form selected for illustration in the accompanying drawings is a highly improved and modified form of the type described in my said Case B.

In the accompanying drawings, which illustrate a "focus-indicating position changer" actually constructed and used by me more than ten years ago;

Figure 1 is a fractional face view, and Fig. 2 is a fractional side view, of the camera and its focuser.

Fig. 3 is a plan of the main and the auxiliary base plates used in the mount of the pivoted mirror.

Fig. 4 is a vertical, longitudinal, section of the pivoted mirror and its mount in complete assembled relation; save as to that part of Fig. 6 which is lettered 96 to 99, and which is omitted in the present Fig. 4 for clearness.

Fig. 5 is an inside elevation of a brace that serves to hold and clamp the pivoted mirror in fixed relation to the auxiliary base plate of its pivoted mount.

Fig. 6 is a plan of the lower or main base plate of the mirror mount and of the cylindrical cam used to lift, and more or less incline, the auxiliary base plate on the line $xy$ as pivotal axis.

The camera, Fig. 1, is a folding bellows camera of the usual construction comprising: a box 23; a hinged cover 19 which opens and locks in horizontal position to serve as camera bed; a bar 50 adapted to slide, in and out, on the bed 19; and a rectangular lens-carrying frame 51, 52, 53, which is temporarily fixed in the desired relation to bar 50 by turning the clamping lever 55 while the base 52 of the lens frame is being held pressed up against stop 290.

The focuser frame 60, 61, 62, 63, has its inner side wall 60 fixed to the upright 51 of the lens frame by a horizontal bolt 64 and by screws which are not shown.

The optical elements of the focuser are substantially the same as in my said Case C, and therefore comprise: either a single or compound eccentric divergent-lens L; a fixed prism P cemented on the outer face of lens L; and a mirror C pivoted to turn on the horizontal shaft 65, under the action of a cam plate K. This cam plate K is adjustably fastened to the bracket 66 by screws 67, 68, and acts directly on the tail-piece 69 of the pivoted mirror to lift the same in opposition to the downward pressure of spring 70.

The position of the operator's eye, indicated by E, is determined, as in my said Case J, by providing separate and independent means for determining its position first horizontally, or in azimuth; then, vertically or in altitude. Its position in azimuth is fixed by the imaginary vertical plane which passes through the vertical meridian line marked on finder lens L and through the middle point of a peep 25 which is cut into the upper edge of the box 23; while its position in altitude is determined by raising the eye, in the said vertical plane, until the reflected image of a horizontal wire 24 is seen at the middle of the eye mirror P.

So far all parts are substantially as in my said Case C and coöperate to produce a vertically movable image in prism P, whose vertical path secures a "focus-indicating position" of coincidence, or only of alinement, accordingly as the mirror C is or is not adapted to be brought into exact parallelism with the reflecting face of prism P.

The novel structural features which involve the present invention are all contained in the mount of the pivoted mirror C.

This mount comprises a main base plate 80, Figs. 2, 3, 4, and 6, which is rearwardly extended to form the before-mentioned tail-piece 69.

The forward end of plate 80 is provided with two V-bearings 81, 82, which bear and turn on the enlarged ends of the fixed shaft 65. A hook 83 passed upwardly through a hole 84 (Fig. 6) and then downwardly through hole 84', serves to connect this base plate 80 with the spring 70, which is thus made to keep the two V-bearings 81, 82 in contact with shaft 65 and the tail-piece 69 in contact with the cam plate K, substantially as explained in my said Case C, except that the two holes 84, 84' here shown, serve to positively keep the hook 83 in proper position to admit the spring 70 while the parts are being assembled.

The base plate 80, in the present arrangement, has riveted thereon two fixed conical studs 85, 86, which determine the auxiliary pivotal axis $xy$, Fig. 6, of the pivoted mirror.

On these studs 85, 86 is mounted the auxiliary base plate 87 which, as seen in Fig. 3, has a small round hole 88, to engage with stud 85, and an elongated slot 89, to engage with stud 86.

The third resting point of the auxiliary plate 87 is formed by a screw 90, shown dotted in Fig. 3, and which passes up through a threaded hole formed in the main base plate 80.

A bolt 91, Figs. 3, 4 and 6, with nut 92, Fig. 4, spring 93 and washer 94, serves to keep the auxiliary base plate 87 in firm contact with its three supporting points 85, 86 and 90.

The auxiliary plate 87 does not bear directly on screw 90, but is separated therefrom by an arcuate wedge or cam 96, Figs. 1, 2 and 6, which is carried by a radial arm 97, Fig. 6, pivoted on a cylindrical part of stud 86, and actuated by means of the second radial arm 98, whose outer end is bent downwardly and coiled to form a handle 99.

The extreme angular positions that may be occupied by arm 98 are determined by radial abutments 100 and 101, Fig. 6, formed in the main base plate 80. The arcuate wedge 96 is thickest at its rear radial end 96', Fig. 6; and it is thinnest at its forward radial end, near the terminal point of leader 96 in Fig. 6.

When, therefore, the handle 99 is held pressed firmly against the rear stop 100 of the main base plate 80, it is the thinnest usable part of the wedge that rests on the end of screw 90; and when the handle 99 is held pressed in contact with the forward stop 101 of main base plate 80, it is the thickest usable part 96' of the wedge that rests on the end of the screw 90.

The auxiliary base plate 87 being on top of the wedge 97 can accordingly be raised and lowered very quickly and at will, with reference to the main base plate 80, about axis $xy$, Fig. 6, as its pivotal axis, from one extreme relative angular position to the opposite extreme relative angular position, through all intermediate values, by simply acting on handle 99.

The auxiliary base plate 87 has its forward end provided with pockets 102, 103, to admit and hold the lower corners of mirror C, and its rear end is recessed at 104, 105, to admit and hold the feet 106, 107, Fig. 5, formed on a brace 108, whose upper end is bent over at 109 to grip and hold the upper edge of mirror C. The brace 108 and the auxiliary base plate 87 are drawn together to firmly clamp the mirror C, by means of a bolt 110 which passes first through a tongue 111 struck up from in the plate 87, then through a nut 112 which is lodged in a rectangular opening 113, Fig. 5, formed in the brace 108. A groove 114 in the lower edge of this opening 113, provides the play room required for bolt 110, and insures that the pull of the bolt on nut 112 shall be in alinement with the lower inclined bearing edge of opening 113.

*Operation.*

The cam K acts to cause the image seen by reflection in C and P to rise and fall along a vertical path, and this vertical path can be offset horizontally by changing the inclination of the auxiliary base plate 87 on the main base plate 80.

The device is adjusted by acting on screw 90. To adjust, wedge 96 is first drawn back as far as permitted by the rear stop 100 and then, using a vertical or plumb line as test object, is turned as much as may be necessary to secure zero offset in the vertical path of the movable image; that is to say the movable image of the plumb line must be offset horizontally by means of screw 90 until it is brought into coincidence with the immovable image of the same vertical or plumb line.

If now the wedge 96 is pushed in, it will lift the mirror C, about axis *xy*, and it will offset the path of the movable image seen in P toward the outer wall 62 of the focuser, and this offset can be made as small or as large as desired within the extreme limits imposed by the two positive stops 100 and 101 in the base plate 80, Fig. 6.

As explained above, screw 90 was set, in the present instance, so that the forward stop 101 should determine a minimum offset equal to zero; but the screw 90 might evidently have been set lower, to produce a minimum offset that is negative, if desired. The range from zero offset up, will generally prove sufficient.

NOTE 1.—The "offset" focus-indicating position is so much more useful than the "coincident" focus-indicating position, that the operator will generally keep it as the normal focus-indicating position.

NOTE 2.—Where the focuser is of the two-image type seen in Fig. 39 of my said Case A, a change in the focus-indicating position may easily be made by producing an offset in either one or both of the two images.

NOTE 3.—Where the focuser is of the two image type with one of the images normally fixed, the change in the focus-indicating position may be made by offsetting the said stationary image.

NOTE 4.—When screw 90 is either raised or lowered, it really changes the two extreme positions of the auxiliary plate 87, that is to say: If it depresses the lowest position of the auxiliary plate 87 one-half degree, for instance, it must simultaneously depress the highest position by the same amount, but the exact value of this upper limit is not important.

NOTE 5.—I am aware that Barr and Stroud, prior to 1896, were quite familiar with the fact that a very small single object point cannot practically be utilized to produce two simultaneously visible and distinguishable partial point images; and that they overcame the difficulty to their entire satisfaction, for naval range-finding purposes, by the use of a cylindrical-lens system called an "astigmatizer." See the thirty-four-line paragraph entitled "Astigmatizer" in "*Institution of Mechanical Engineers, Proceedings, London,*" January, 1896, pages 46, 47. This Barr and Stroud solution, however, could not satisfactorily be used in combination with a camera finder, because it mutilates the whole image beyond recognition, as seen: first, in their Fig. 26, plate 8, where the line effect produced on a single small object point is shown; and secondly, their Fig. 27, plate 8, where the comblike effect produced a series of small object points is shown.

NOTE 6.—My said Case A, page 20, lines 104 to 108, lays down the general principle that when a camera, having an "optical focuser," is also provided with the usual focusing or distance scale, as shown in Figs. 32, 33 and especially in Fig. 57$^b$ of said Case A, the device is not only telemetric in principle, but it furthermore becomes, in fact, a range finder. Such range finder, that of the said Fig. 57$^b$, for instance, would however, still be complete as a range finder, after removal of the camera objective, and, therefore, my present invention is not limited to photographic cameras.

NOTE 7.—When, therefore, in view of Note 6, above, my present path offsetter is applied to the focuser of my said Case B, where the camera is already provided with a focusing or distance scale, and the offsetter simply serves to shift from the series of image phases shown in Figs. 11 to 13 of said Case B, to the series shown in its Figs. 14 to 16, the resultant assemblage must virtually comprise four different operative combinations, to wit: (1) the two-element combination of camera and distance scale, which is operative, without the focuser, in the ordinary way, for focusing on an object whose distance is known; (2) the two-element combination of focuser and distance scale which is operative, without the camera lens, as a simple range finder; (3) the two-element combination of focuser and camera, which is operative without the scale for focusing by changing the depth of the camera to bring the two distinct retinal images into their focus indicating position; (4) three-element combination of focuser, camera, and distance scale, which is operative for exposing an either approaching or receding moving object, at the instant when it is situated at a predetermined distance from the camera, such result being obtained in two steps, to wit: first, by using the scale to set the camera in focus for the desired distance; and, secondly, by waiting for the instant when, the, in such case, relatively moving retinal images of the moving object, have automatically come into the focus indicating relative position.

My present invention is therefore directly applicable to all military, naval and other range finders proper of the special and now more commonly used duplicate image type; as a substitute for the Barr and Stroud astimatizer of Note 5 above, over which it has the following advantages, to wit: first, that it can be applied to any standard military or naval range finder without adding a single optical element to the optical combination as it is now manufactured, when made without an "astigmatizer"; secondly, that its presence, when set for zero offset, does not in any way modify or interfere with the normal action and use of the range finder; thirdly, that it is quickly thrown either into use or out of use, by a simple motion of the hand; fourthly, that by a more careful motion of the hand, executed while observing, the lateral offset of the range-indicating position of the two images can be varied to any desired degree that may prove most effective in the particular case.

NOTE 8.—My screw 90 controls what Barr and Stroud have defined (page 54, lines 6 to 25, of their paper cited in Note 5 above) as the "halving adjustment"; and it therefore corresponds, in function, to the Barr and Stroud screw H, Fig. 40, plate 12.

What I claim as my invention and desire to secure by Letters Patent is:

1. The combination with a focusing camera comprising an optical focuser of the type adapted to form at least one movable image, and having means for offsetting the relative path of such movable image to permit of securing different desirable characteristic focus-indicating positions; of a movable mechanical element adapted to control such means and to operate the same during the use of the focuser, for quickly changing from one of the said characteristic focus-indicating positions to another.

2. The combination with a focusing camera comprising an optical focuser of the type adapted to form at least one movable image, and having means for offsetting the relative path of such movable image to permit of securing different desirable characteristic focus-indicating positions; of a movable mechanical element adapted to control such means and to operate the same during the use of the focuser, for quickly changing from one of the said characteristic focus-indicating positions to another; and positive stops to determine the free range of motion of such movable mechanical element.

3. The combination with an optical focuser of the type adapted to form with rays from an object point to be focused on at least one movable image having a characteristic focus indicating position, said focuser comprising a part that is movable between definite limits and whose motion is adapted to offset the path of the said movable image; of adjustable means for fixing one of said limits to permit of securing exact zero offset.

4. The combination with a focusing camera comprising an optical focuser of the type adapted to form two relatively movable retinal images having a normal characteristic focus-indicating relative position; of means for changing said normal characteristic focus-indicating relative position into a different or abnormal but focally equivalent characteristic focus-indicating relative position; said means comprising two different adjustments, one distinguished as fine or slow, the other as coarse or rapid; that which is relatively fine or slow being adapted to determine a positive but adjustable limit to that which is relatively coarse or rapid.

5. The combination with a focusing camera comprising an optical focuser of the type adapted to form two relatively movable retinal images having a normal characteristic focus-indicating relative position; of means for changing said normal characteristic focus-indicating relative position into a different or abnormal but focally equivalent characteristic focus-indicating relative position; said means comprising a manually movable mechanical element adapted to be moved for changing the nature of the said characteristic focus-indicating relative position; and a positive stop for limiting its extent of motion in the direction that leads to the said normal characteristic focus-indicating position.

6. The combination with a focusing camera comprising an optical focuser of the type adapted to form two relatively movable retinal images having a normal characteristic focus-indicating relative position; of means for changing said normal characteristic focus-indicating relative position, into a different or abnormal but focally equivalent characteristic focus-indicating relative position; said means comprising a manually movable mechanical element adapted to be moved for changing the nature of the said characteristic focus-indicating relative position; a positive stop for limiting its extent of motion in the direction that leads to the said normal characteristic focus-indicating position; and a second positive stop for limiting its motion in the direction that leads to the said abnormal characteristic focus-indicating position.

7. The combination with a focusing camera comprising an optical focuser of the type adapted to form two relatively movable retinal images having a normal characteristic focus-indicating relative position; of means for changing said normal characteristic focus-indicating relative position into a different or abnormal but focally equivalent characteristic focus-indicating relative position; means comprising a manually movable mechanical element; a positive stop for limiting its extent of motion in the direction that leads to the said normal characteristic focus-indicating position; and a second normally fixed but adjustable element adapted to be set to secure a slight desirable change in the nature of said normal characteristic focus-indicating relative position.

8. The combination with an optical instrument of the type adapted to form two relatively movable retinal images of the object point to be observed, said images having a normal characteristic relative observation position; of means for changing said characteristic relative observation position into a different or abnormal but equivalent characteristic relative observation position; said means comprising a manually movable mechanical element adapted to be moved for changing the nature of the said characteristic relative observation position; and a positive stop for limiting its extent of motion in the direction that leads to the said normal characteristic relative observation position.

9. The combination with an optical instrument of the type adapted to form two retinal images of an object point to be observed with said instrument, and comprising a relatively movable element whose relative motions are adapted to impart to said two retinal images a relative displacement such as to cause the said two retinal images to pass through a normal characteristic relative position which indicates that the said instrument has properly been set for the object point that is being observed; of means for changing said normal characteristic set-indicating relative position into a different or abnormal but indicatively equivalent characteristic set-indicating relative position; said means comprising a manually movable mechanical element adapted to be moved for changing the nature of the said characteristic set-indicating relative position; and a positive stop for limiting its extent of motion in the direction that leads to the said normal characteristic set-indicating relative position.

In testimony whereof I have signed my name to this specification.

JOSEPH BECKER.